T. WALMSLEY.
LINE SHAFTING.
APPLICATION FILED JULY 17, 1919.

1,371,654.

Patented Mar. 15, 1921.

INVENTOR.
T. Walmsley,
BY
ATTORNEYS.

UNITED STATES PATENT OFFICE.

THOMAS WALMSLEY, OF SHERMAN, CALIFORNIA.

LINE-SHAFTING.

1,371,654.  Specification of Letters Patent.  Patented Mar. 15, 1921.

Application filed July 17, 1919. Serial No. 311,612.

*To all whom it may concern:*

Be it known that I, THOMAS WALMSLEY, a citizen of the United States, residing at Sherman, in the county of Los Angeles and State of California, have invented new and useful Improvements in Line-Shaftings, of which the following is a specification.

My invention relates to line shafts and consists of the novel features herein shown, described and claimed.

Specifically my object is to make an improved bearing for mounting the shafts carrying the hands of tower clocks.

Figure 1:
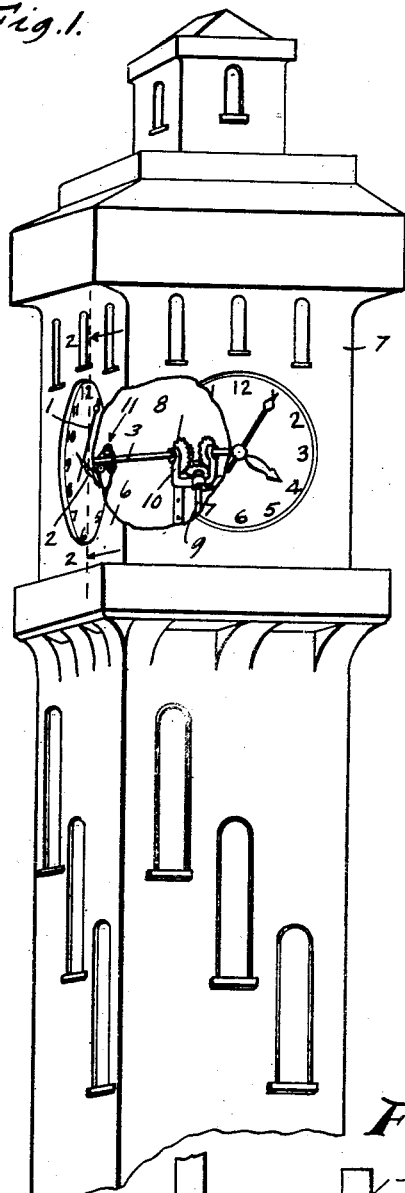
Figure 1 is a perspective of a tower clock provided with a shaft bearing embodying the principles of my invention.
Figure 2:
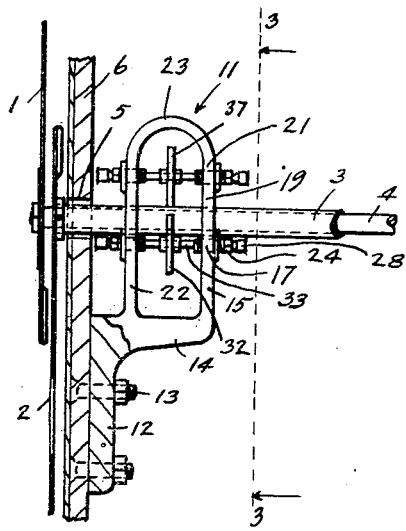
Fig. 2 is a fragmentary sectional detail on the line 2—2 of Fig. 1 and upon an enlarged scale.
Figure 3:
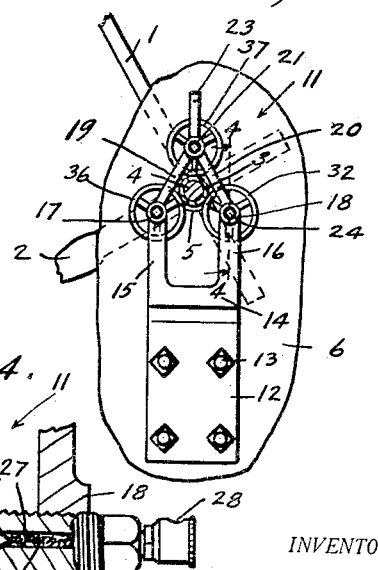
Fig. 3 is a fragmentary sectional detail on the line 3—3 of Fig. 2 and looking in the direction indicated by the arrows.

In tower clocks the hands 1 and 2 are mounted on shafts 3 and 4. The shaft 3 is tubular and the shaft 4 extends through the shaft 3, so that it is only necessary to provide a bearing for the shaft 3. The shaft 3 extends loosely through an opening 5 in the front wall 6 of the clock tower 7, and the rear ends of the shafts 3 and 4 are connected to gears 8 driven by a vertical shaft 9.

The rear ends of the shafts 3 and 4 are supported in a bearing 10 and at the front end the shaft 3 is supported in my improved shaft bearing 11.

The details of the shaft bearing 11 are as follows:

An attaching plate 12 fits against the inner face of the wall 6 and is secured in place by bolts 13. A base 14 extends horizontally from the upper end of the attaching plate 12. Posts 15 and 16 extend upwardly from the inner side of the base 14. Bearings 17 and 18 are formed through the upper ends of the posts 15 and 16. Arms 19 and 20 extend upwardly and inwardly from the bearings 17 and 18, the upper ends of the arms being joined. A bearing 21 is formed at the joined ends of the arms 19 and 20.

A support 22 extends upwardly from the inner side of the base 14 parallel with the outer support and having parts corresponding to the posts 15 and 16, the bearings 17 and 18, the arms 19 and 20, and the bearing 21, and a brace 23 connects the upper ends of the two supports.

Figure 4:
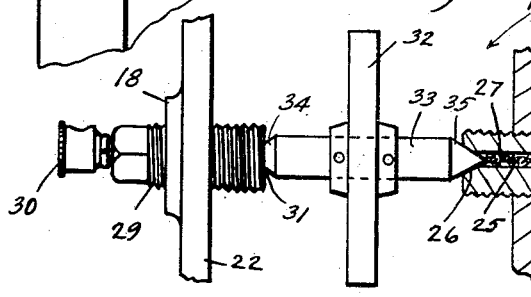
Fig. 4 is a fragmentary enlarged sectional detail on the line 4—4 of Fig. 3.

The bearings 17, 18 and 21 in the inner support and the mating bearings in the outer support are constructed as shown in detail in Fig. 4. A plug 24 is screw seated through the post 16 and has a central bore 25 and a tapered seat 26 at the inner end of the bore. An oiled wicking 27 is placed in the bore 25 and an oil cup 28 is attached to the outer end of the plug 24. The mating bearing 18 has a plug 29 screwed through the outer support 22, an oil cup 30 connected to the plug 29, and a tapered seat 31 at the inner end of the plug. The bearing wheel 32 is fixed upon a spindle 33 having conical bearing points 34 and 35 fitting in the seats 31 and 26.

In a like manner the bearing wheels 36 and 37 are mounted in the bearings 17 and 21. The bearing wheels 32, 36 and 37 are arranged radially relative to the center or axis of the shaft 4 and fit against the periphery of the tubular shaft 3, so that the outer end of the shaft 3 is supported by the wheel.

The bearing thus produced is very sensitive, easily adjusted and easily kept in order and serves effectually to support the outer ends of the clock hand shafts with the least possible resistance.

Various changes may be made without departing from the spirit of my invention as claimed.

I claim:

1. A bearing for the outer ends of the hand shafts of tower clocks comprising an attaching plate adapted to be secured to the inner face of a tower wall, a base extending inwardly from the attaching plate, supports extending upwardly from the base, plugs screw seated through the supports and arranged radially relative to the shaft axis, wheels engaging the shaft and having spindles with pointed ends extending into seats in the plugs, there being oil passages through the plugs to the points of the spindles, and oil cups at the outer ends of the plugs.

2. In a shaft bearing the combination of rollers having pointed spindles arranged radially about the shaft and engaging the periphery thereof, adjustable bearings for said rollers, comprising opposed plugs supported in a frame and having seats in their inner ends for supporting the pointed ends of the roller spindles, said plugs being axially adjustable in the frame, and means to lubricate the bearings through the plugs.

3. In a shaft bearing the combination of rollers having pointed spindles projecting from either side thereof, said rollers being arranged radially about the shaft and engaging the periphery thereof, adjustable bearings for said rollers comprising axially opposed plugs screw-threadedly supported in a frame and having conical seats in their inner ends adapted to seat the pointed ends of the spindles of said rollers, central bores extending through the plugs and communicating with oil cups on the outer ends thereof to provide a lubricant to the said bearings.

In testimony whereof I have signed my name to this specification.

THOMAS WALMSLEY.